United States Patent
Frielingsdorf et al.

[11] Patent Number: 5,974,665
[45] Date of Patent: *Nov. 2, 1999

[54] METHOD OF ASSEMBLING A WHEEL HUB, A CONSTANT VELOCITY JOINT AND SUPPORT MEANS

[75] Inventors: Herbert Frielingsdorf, Lohmar; Werner Krude, Neunkirchen, both of Germany

[73] Assignee: GKN Automotive AG, Lohmar, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/787,942

[22] Filed: Jan. 23, 1997

[30] Foreign Application Priority Data

Jan. 24, 1996 [DE] Germany .......................... 196 02 407

[51] Int. Cl.$^6$ ............................. B23P 11/02; B23P 19/02; B21K 1/40
[52] U.S. Cl. ..................... 29/894.361; 29/446; 29/525; 29/898.09; 384/544; 464/178
[58] Field of Search ..................... 464/178, 179, 464/182, 145, 906; 403/282, 274, 359; 384/544; 301/124.1, 126, 131; 180/258, 259; 29/525, 446, 898.07, 898.09, 894.361

[56] References Cited

U.S. PATENT DOCUMENTS

| | | | |
|---|---|---|---|
| 4,416,564 | 11/1983 | Billet et al. .......................... | 403/282 |
| 4,537,270 | 8/1985 | Brandensein et al. .............. | 180/259 X |
| 4,571,009 | 2/1986 | Balken et al. ....................... | 384/544 X |
| 4,629,028 | 12/1986 | Krude et al. ............................ | 180/259 |
| 4,765,688 | 8/1988 | Hofmann et al. .................... | 301/124.1 |
| 4,835,829 | 6/1989 | Welschof et al. ................... | 384/544 X |
| 4,886,392 | 12/1989 | Lio ......................................... | 403/282 |
| 4,986,607 | 1/1991 | Hofmann et al. ....................... | 301/124 |
| 5,158,390 | 10/1992 | Ito et al. ................................. | 403/282 |
| 5,356,236 | 10/1994 | Duboue ................................. | 403/359 |
| 5,536,098 | 7/1996 | Schwarzler ........................... | 464/282 |
| 5,549,514 | 8/1996 | Welschof ............................... | 464/145 |
| 5,607,358 | 3/1997 | Stall et al. ......................... | 464/182 X |

FOREIGN PATENT DOCUMENTS 0610782  8/1994  European Pat. Off. .
3636243  5/1988  Germany .

Primary Examiner—P. W. Echols
Attorney, Agent, or Firm—Howard & Howard

[57] ABSTRACT

An assembly for driving and supporting a wheel has a wheel hub 20 and an outer joint member 31. The wheel hub 20 includes a flange 21 which connects the wheel 5 and the wheel hub 20 together. A constant velocity joint is rotatably supported on a wheel carrier 8 by a supporting means. The constant velocity joint is fixed for torque transmitting purposes and is rotatably supported about an axis by a rolling contact bearing 14 having two rows of rolling contact members 17, 18. Two inter-engaging sets of teeth 29, 29' secure the constant velocity joint to the wheel hub 20. The first set of teeth 29 moves axially in relation to the outer joint member 31 causing the second set of teeth 29' to be formed in a bore 33 within the outer joint member 31 during assembly.

11 Claims, 3 Drawing Sheets

METHOD OF ASSEMBLING A WHEEL HUB, A CONSTANT VELOCITY JOINT AND SUPPORT MEANS

BACKGROUND OF THE INVENTION

This invention relates to an assembly for driving and supporting a wheel hub on a wheel carrier of a motor vehicle.

The invention relates to an assembly for driving and supporting a wheel of a motor vehicle, which comprises a wheel hub, a constant velocity joint and means for supporting the assembly on the wheel carrier of the motor vehicle. The wheel hub is associated with a flange for fixing the wheel. The constant velocity joint is fixed to the wheel hub for transmitting torque. The wheel hub is rotatably supported around a common longitudinal axis of a rolling contact bearing comprising two rows of rolling contact members supported by an outer bearing ring at the wheel carrier. The two rows of rolling contact members are tensioned relative to one another in the direction of the longitudinal axis. An outer joint member secures the constant velocity joint to the wheel hub in a direction or rotation around the longitudinal axis by two inter-engaging sets of teeth. The outer joint member is secured along the longitudinal axis. Further, the rolling contact members are guided for rolling on axially spaced outer tracks of the outer bearing ring facing away from one another and on inner tracks facing one another. The first teeth set is arranged at the end, removed from the flange, and behind the bearing face, to receive the separate inner bearing ring. The first set of teeth comprises teeth extending parallel to the longitudinal axis.

Such an assembly is described in EP 0 610 782 A1 wherein the separate inner bearing ring is form-fittingly secured to the wheel hub. In the region adjoining the seat face for the inner bearing ring, the wheel hub comprises a set of teeth. The outer joint member of the connected constant velocity joint comprises a bore. Teeth are worked into the bore. The teeth of the outer joint member interlock with the teeth of the wheel hub. The outer joint member is axially secured to the wheel hub by a securing ring.

U.S. Pat. No. 4,986,607 describes a wheel bearing assembly wherein a first inner face is worked into a wheel hub near a flange. The outer joint member of a constant velocity joint comprises a second inner face and a journal which projects towards the flange of the wheel hub and extends into a bore in the wheel hub towards the flange. Underneath the flange, the wheel hub in its bore, comprises a bore part which increases conically in size away from the outer bearing ring and constant velocity joint. The wheel hub includes a set of hardened teeth which also expands conically in this bore part. After the outer joint member is fitted into the wheel hub, the journal end is plastically deformed such that material is displaced outwardly and reaches the empty spaces between the hardened teeth of the wheel hub. As a result, the outer joint member is fixed relative to the wheel hub, in both the axial direction and the direction of rotation around the longitudinal axis.

The disadvantage of such an arrangement and assembly method is that relatively high deformation forces are necessary to cause the material to flow into the gaps between the teeth. A further disadvantage is that the wheel hub has to be subjected to high radial forces. Further, it is essential to provide a relatively solid assembly, i.e. the assembly is relatively heavy because it needs a solid journal at the outer joint member of the constant velocity joint. Furthermore, it is necessary for the outer joint member to be produced from a relatively expensive material because it comprises an inner track, i.e. it has to be made of a rolling contact bearing steel, whereas traditionally, constant velocity joints are made of a relatively reasonably priced induction-hardenable or case-hardenable steel.

The known embodiments are also deficient in that relatively high axial deformation forces are generated when fixing the outer joint member relative to the wheel hub. There is a risk that the necessary pretension in the rolling contact bearing will not be observed with the required degree of accuracy.

DE 36 36 243 A1 describes a non-rotating connection between the inner bearing ring and the wheel hub of a wheel bearing constant velocity joint unit, wherein the inner bearing ring, prior to assembly, includes teeth. A portion of the wheel hub is a collar formed by coining to form-fit a connection between two parts. The inner ring includes teeth to be connected to teeth of the outer joint part of the constant velocity joint.

SUMMARY OF THE INVENTION AND ADVANTAGES

It is the object of the subject invention to provide an assembly of the above-mentioned type which is simplified, with reduced costs, and the required pretension in the rolling contact bearing is simply maintained with a desired degree of accuracy. In accordance with the subject invention, the objective is achieved by forming a second set of teeth into a bore of an outer joint member during the course of assembly as a first set of teeth is moving relative to the outer joint member.

The advantage of this embodiment is that by utilizing the first set of teeth when joining a wheel hub and an outer joint member only low forces are required because the wheel hub teeth acts like a punching tool. Furthermore, it is advantageous that during the joining operation, the bearing function is not adversely affected because material flows away from the rolling contact bearing. Because the teeth extending parallel to the longitudinal axis do not generate any radial forces, the bearing function is not influenced. At least one of the inner tracks is associated with a separate bearing ring. Therefore, the outer joint member of the connected constant velocity joint does not have to be made of a rolling contact bearing steel, i.e. it can be produced from a standard induction-hardenable or case-hardenable steel.

Alternatively, it is possible for the first set of teeth to form part of the wheel hub. This is advantageous because the outer joint member can be used to keep the rolling contact bearing in a pretensioned condition by supporting it on an end face of the inner bearing ring. However, it is also possible to provide the first set of teeth as part of a separate ring which keeps the rolling contact bearing in a pretensioned condition by supporting it on an end face of the inner bearing ring.

One substantial advantage of the first embodiment is that the material flows away from the rolling contact bearing. The pretensioning force for the bearing is easier to predetermine and can be reached with greater accuracy. This is true because the force is not affected by the material flow, as it would be if the teeth were associated with the outer joint member and if the wheel hub had to be deformed accordingly. Finally, an advantage is obtained with respect to the material to be selected for the wheel hub, preferably comprising an inner track. The material must be of a higher quality than the material required for an outer joint member. In many cases it is also quite sufficient that axial security be ensured by displaced material building up in the outer joint member.

The second embodiment is advantageous in that the wheel hub, two rolling contact bearing rows and the ring can be pre-fitted as a finished unit. The connection to the outer joint member of the constant velocity joint is produced thereafter.

According to a further embodiment of the subject invention, the wheel hub comprises a collar in the direction of the longitudinal axis towards its end removed from the flange in a region adjoining the first set of teeth. The collar is used to hold the assembly together, and is deformed outwardly and rests against a holding face inside the outer joint member. The holding face is arranged in a region adjoining the bore. Before the outer joint member is fitted, its bore is cylindrical. The second embodiment comprises a ring having a collar in the direction of the longitudinal axis, away from the flange, and in a region adjoining the first set of teeth. The collar is used to secure the outer joint member to the wheel hub.

The collar is deformed outwardly and rests against a holding face inside the outer joint member. The holding face is arranged in a region adjoining the bore.

The inner track arranged near the flange preferably forms part of the wheel hub. For limiting the movement during assembly, the wheel hub includes a contact shoulder for the bearing ring containing the second inner track.

To ensure accurate functioning, the wheel hub is made of a rolling contact bearing steel. The wheel hub bearing face receives the separate inner bearing ring. The teeth and the inner track adjoining the flange are hardened. If there is a separate ring, the first set of teeth associated therewith is hardened.

The outer joint member preferably consists of an induction-hardenable or case-hardenable steel. The bore of the outer joint member is unhardened, i.e. the material is in a soft condition.

If there is provided a ring comprising the first set of teeth, the ring is connected to the hub in a form-fitting or interlocking way. In a preferred embodiment, the connection is produced by welding, using a low-heat and distortion-free welding method.

In a preferred embodiment, the flange is produced integrally with the wheel hub. The rolling contact bearing is preferably in the form of a double-row angular contact ball bearing. The first set of teeth is preferably in the form of pointed teeth with steeply rising flanks and points at the addendum circle.

A particularly advantageous possibility of producing an assembly includes first, the rolling contact bearing with the two rows of rolling contact members comprising the outer bearing ring and the inner bearing ring removed from the flange slid on to the wheel hub. Thereafter, the wheel hub and the outer joint member are moved towards one another along the longitudinal axis while being subjected to an increasing amount of force until the rolling contact bearing is subjected to the required amount of pretension. By developing this embodiment further for a wheel hub including a collar arranged in front of the teeth the application of force continues after the required pretension has been achieved. Independently the collar is deformed by applying force until it contacts the holding face of the outer joint member. The collar is preferably deformed by orbital pressing which requires only low deformation forces. A substantial advantage of the method in accordance with the invention is that the deformation process does not affect the functioning of the rolling contact bearing. In the state of the art according to U.S. Pat. No. 4,986,607, the deformation force to be applied acts against the required pretensioning force of the rolling contact bearing. In the case of the subject invention, both extend in the same direction.

If the first set of teeth is associated with a ring, the method of producing an assembly with the rolling contact bearing having two rows of rolling contact members, includes removing the outer bearing ring and the inner bearing ring from the flange and sliding them on the wheel hub. Thereafter, the ring slides on the wheel hub until the rolling contact bearing comprises the required amount of pretention and is secured thereto while maintaining the pretension. The first set of teeth move relative to the bore of the outer joint member. If the ring comprises a collar arranged in front of the first set of teeth, the outer joint member is fixed by deforming the collar by applying force until it contacts the inner face of the outer joint member. Again, deformation can be effected by orbital pressing.

BRIEF DESCRIPTION OF THE DRAWINGS

Two preferred embodiments of the invention and their use in a motor vehicle are diagrammatically illustrated in the accompanying drawings. Other advantages of the present invention will be readily appreciated as the same becomes better understood by reference to the following detailed description when considered with the accompanying drawings wherein.

DETAILED DESCRIPTION OF A PREFERRED EMBODIMENT

Figure 1:
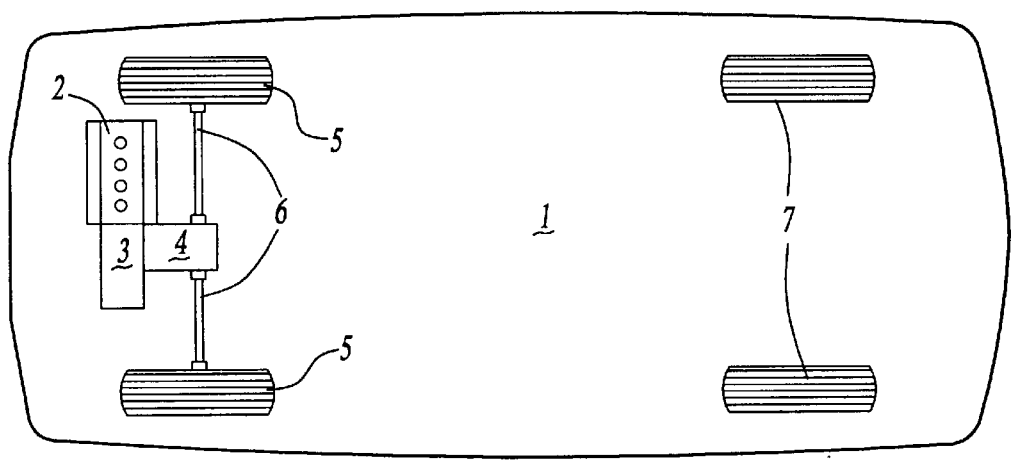
FIG. 1 is a top view showing a drive assembly for a front wheel drive vehicle.

A motor vehicle 1 as shown in FIG. 1 is a front wheel drive vehicle. An engine 2 arranged transversely in the front of the vehicle drives a front axle differential 4 by means of a manual or automatic gearbox 3. The front axle differential 4 comprises two outputs from where side shafts 6 extend to front wheels 5, so that, drivewise, these are connected to the axle differential 4 by the side shafts 6. Rear wheels 7 are merely dragged along, i.e. driven via the road surface on which the vehicle 1 moves.

Figure 2:
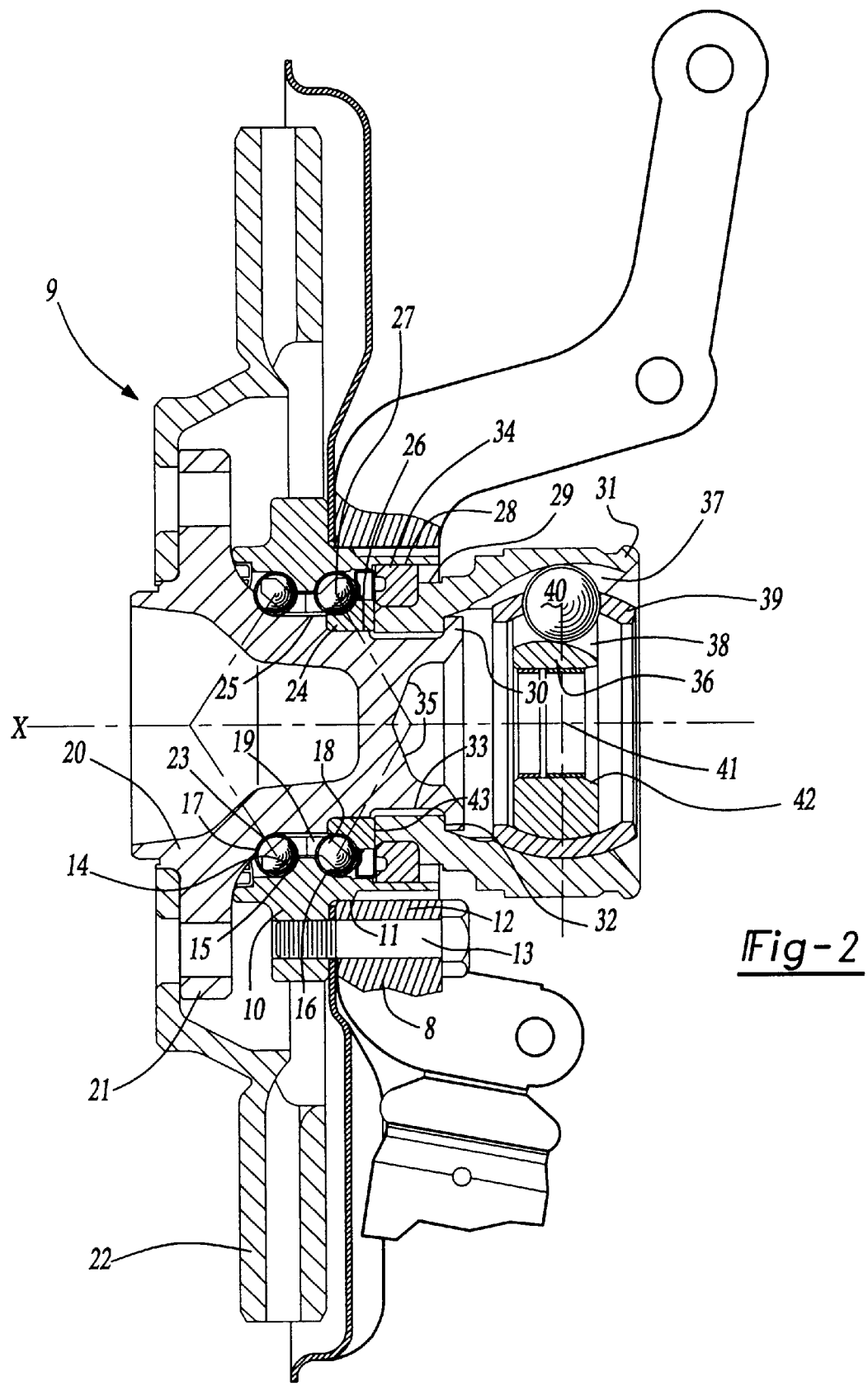
FIG. 2 is a fragmentary longitudinal view showing an assembly in accordance with the invention including a wheel carrier.

FIG. 2 shows the inventive assembly as associated, for example, with the lefthand front wheel 5 of the motor vehicle 1 according to FIG. 1. An assembly 9 is fixed to a wheel carrier 8 of the motor vehicle. For this purpose, the wheel carrier 8 comprises a bore 12 accommodating an outer bearing ring 10 of the assembly 9 by means of a centering face 11. The outer bearing ring 10 is flange-shaped and fixed to the wheel carrier 8 by means of bolts 13.

The outer bearing ring 10 comprises two spaced outer tracks 15, 16 which are arranged on the longitudinal axis X and associated with a rolling contact bearing 14 designed as an angular contact ball bearing so that the two outer tracks 15, 16 face away from one another. The two outer tracks 15, 16 each accommodate a row of rolling contact members 17, 18 held in a cage 19. The outer bearing ring 10 is passed through by a wheel hub 20, which, at its end facing away from the wheel carrier 8, is provided with a flange 21 intended for connecting a brake disc 22 for example and, for example, for fixing the lefthand front wheel of the motor vehicle according to FIG. 1. On its outer face close to the flange 21, the wheel hub 20 comprises a first inner track 23 which is arranged opposite the first outer track 15 of the outer bearing ring 10 and which serves to guide the rolling contact members of the first row of rolling contact members 17. The first inner track 23 is followed by a cylindrical portion of the outer face of the wheel hub 20. There then follows a cylindrical bearing face 26 whose diameter is stepped relative to the longitudinal axis X which also constitutes the axis of rotation of the assembly 9. In the region of transition there is obtained a contact shoulder 27, with a separate inner bearing ring 24 resting thereagainst by means of its end face. The inner bearing ring 24 comprises a second inner track 25 positioned opposite the second outer track 16 of the outer bearing ring 10. Both, together, act as rolling tracks for the rolling contact members of the second row of rolling contact members 18. Away from the flange 21, the cylindrical bearing face 26 is adjoined by a set of teeth 29 having a pointed shape. Teeth 29 are preferably pointed, i.e. the teeth comprise steep flanks and point at the addendum circle.

The outer face of the wheel hub 20 is hardened in the region of the first inner track 23, the bearing face 26 and teeth 29. An outer joint member 31 of a constant velocity joint associated with the side shaft 6 according to FIG. 1 is pressed onto the set of teeth 29. For this purpose, the outer joint member 31 comprises a bore 33 which is cylindrical before the pressing operation takes place. The outer joint member 31 is hollow and, in its interior, comprises a holding face 32 which extends substantially radially relative to the longitudinal axis X and against which there is formed on a collar 30 of the wheel hub 20. Collar 30 is arranged in front of teeth 29. It can also be seen that the wheel hub 20 is solid towards teeth 29, whereas towards the flange 21 and the collar 30, hub 20 in each case includes a recess 35. Recess 35 is provided to allow the engagement of a tool which deforms the collar 30. A corresponding counter-die can be introduced into the wheel hub 20 from the other end. The assembly is effectively sealed by a seal 34 arranged between the outer joint member 31, the inner bearing ring 24 and the outer bearing ring 10 and by a further seal having a sealing function between the outer bearing ring 10 and the outer face of the wheel hub 20 in the region of its flange 21.

Apart from the outer joint member 31, the constant velocity joint comprises an inner joint member 36 received in the outer joint member 31 so as to be pivotable in all directions. The outer joint member 31 and the inner joint member 36 are provided with opposed ball tracks 37, 38 which are circumferentially distributed around the longitudinal axis X and which, together, accommodate a torque transmitting rolling contact member in the form of a ball 40. A cage 39 serves to center an inner joint member 36 and the outer joint member 31 relative to one another in respect of the pivot movement of the inner joint member 36 relative to the outer joint member 31 around an articulation center 41 and for the purpose of guiding balls 40. The inner joint member 36 comprises a toothed bore 42 for receiving an intermediate shaft associated with the side shaft as shown FIG. 1 and which passes on the driving movement. The outer joint member 31, by means of an end face 43, is supported on the end face 28 of the inner bearing ring 24 and secures same.

Figures 3, 4:
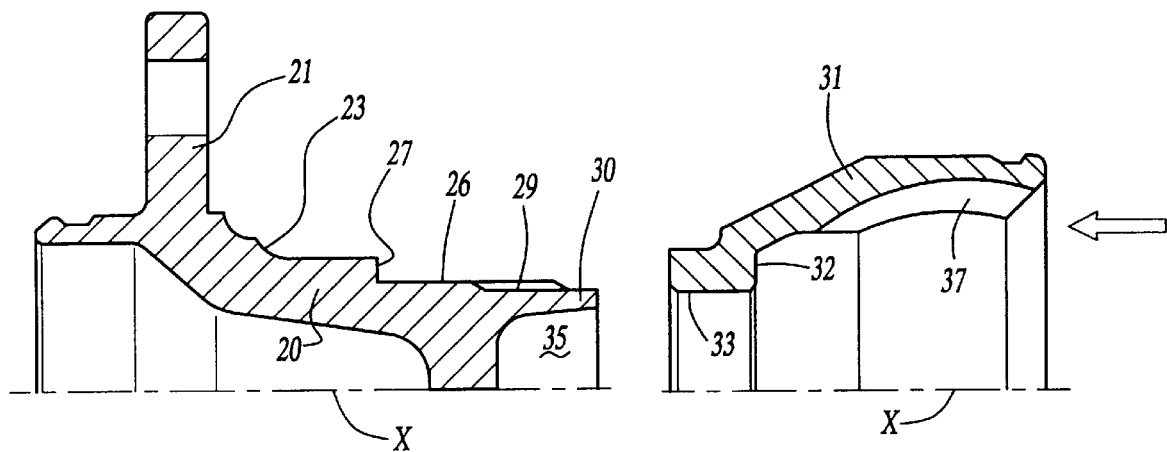
FIG. 3 is a fragmentary longitudinal view showing a wheel hub shown as an individual component.
FIG. 4 is a fragmentary longitudinal view showing an outerjoint member of a constant velocity joint associated with a wheel hub prior to assembly.

FIG. 3 shows the wheel hub 20 prior to assembly. The wheel hub 20 has flange 21, first inner track 23, an adjoining cylindrical portion, a cylindrical bearing face 26 stepped relative to the latter, the contact shoulder 27 provided in the region of transition between the cylindrical portion and the bearing face 26 for the inner bearing ring 24, teeth 29 extending away from the flange 21 with approximately the same diameter as the bearing face 26, and collar 30 arranged in front of the teeth 29. It can also be seen that the collar 30 is still undeformed, i.e. its outer face is still cylindrical. Teeth 29 are shaped in such a way that the teeth 29 extend towards the collar 30. The wheel hub 20 is made of a rolling contact bearing steel, with at least the inner track 23, the cylindrical bearing face 26 with the contact shoulder 27 and teeth 29 being hardened. However, the cylindrical portion between the first inner track 23 and the contact shoulder 27 may also be hardened.

FIG. 4 shows the outer joint member 31 of the constant velocity joint. Outer ball track 37 is for receiving a torque transmitting ball, the portion pointing towards the teeth 29 for comprising a cylindrical bore 33 which is greater than the outer diameter of the undeformed collar 30. Holding face 32 is spaced towards the outer ball track 37, and extends at a right angle, i.e. radially relative to the longitudinal axis X.

The assembly 9 is fitted together such that, for example, the outer bearing ring 10 together with the already preassembled rows of rolling contact members 17, 18 and the seal provided at the flange end are slid on to the wheel hub 20. Then, the inner bearing ring 24 is slid on to the bearing face 26. Subsequently, the outer joint member 31, together with the seal associated therewith for sealing the assembly 9, is slid in the direction of the arrow according to FIG. 5 on to the wheel hub 20. During this movement cylindrical bore 33 comes into contact with teeth 29, cutting into the wall region of the bore 33.

Figure 5:
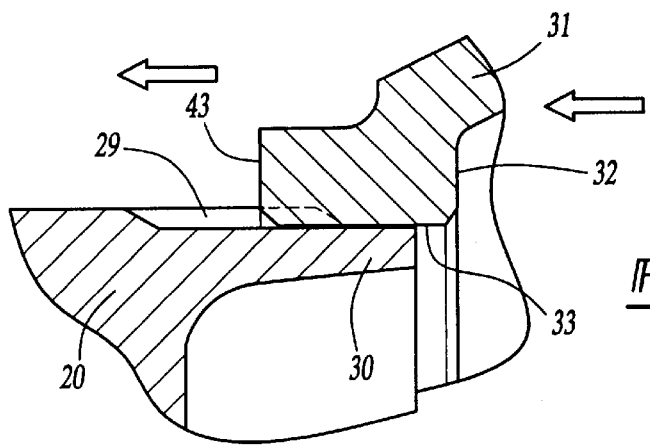
FIG. 5 is a fragmentary cross sectional view showing a wheel hub and an outer joint member associated with one another during assembly.

FIG. 5 shows that cutting has already taken place, with the material of the outer joint member 31 being pushed against the direction of the arrow into the interior of the outer joint member 31. The pressing operation continues until the required pretension for the rolling contact bearing 14 has been achieved. The cutting forces required for assembly purposes are lower than the force required for achieving the pretension in the rolling contact bearing 14. As a consequence, the parts of the wheel hub 20 and of the outer joint member 31 continue to move towards one another until the pretensioning force has been achieved. Subsequently, by maintaining the pretension through the application of force, the collar 30 is deformed outwardly from the longitudinal axis X until it comes to rest against the holding face 32. Prior to deformation, the collar 30 with its cylindrical shape is positioned inside the outer joint member 31. The recess 35 allows the deformation tool to engage. The deformation of the collar 30 to bring same into contact with the holding face 32 is achieved by orbital pressing or by means of a pressing mandrel. During the deformation operation, the deformation forces act on the wheel hub 20 only. The pretensioning force acting between the wheel hub 20 and the outer joint member 31 may be maintained and measured, so that even during the process of deforming the collar 30 for joining purposes, the pretensioning force cannot be exceeded by excessive deformation of the collar 30.

Figure 6:
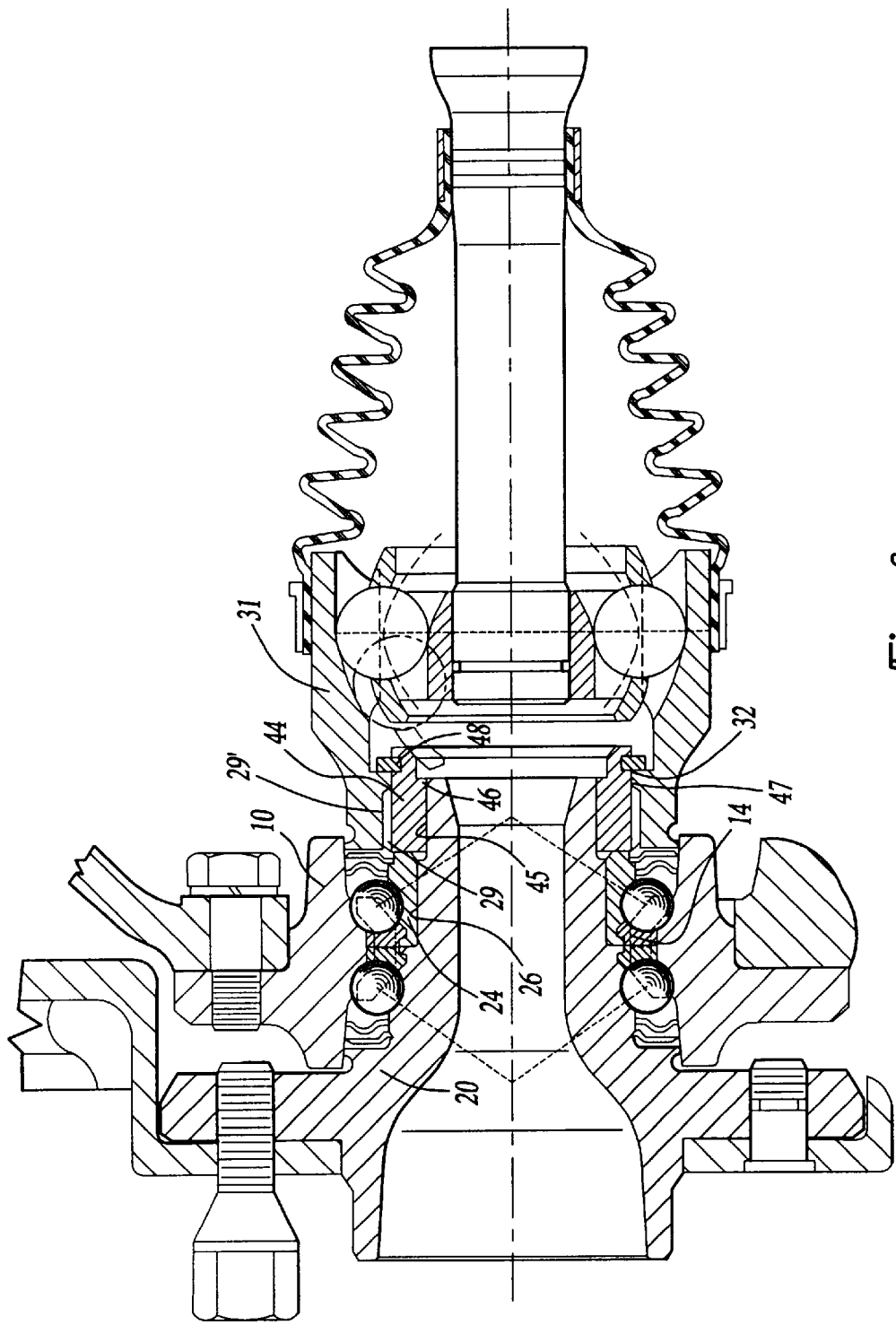
FIG. 6 is a longitudinal view showing a section of an embodiment wherein a first set of teeth is associated with a separate bearing ring.

FIG. 6 shows an assembly wherein the inner bearing ring 24 of the rolling contact bearing 14 is secured to the wheel hub 20 by a separate ring 44 received on a seat face 45 following the bearing face 26. The separate ring 44 is secured to the wheel hub 20 through a weld 46 and maintains the pretension in the rolling contact bearing 14. On its outer face, the ring 44 carries the first set of teeth 29 which is hardened and by means of which the second set of teeth 29' was formed into the cylindrical bore 33 of the outer joint member 31. Since teeth 29' are axially shorter than the cylindrical bore 33 in the outer joint member 31 prior to the joining operation, the pressing operation results in a material build-up in the form of a bead 47 in the bore 33. Bead 47 forms a holding face 32. During the joining operation, the movement can be controlled in such a way that it ceases as soon as the bead 47 has reached the recess in the ring 44 for receiving the securing ring 48. Thereafter, a securing ring 48 is fitted in the turned-out region in the outer joint member 31. The outer joint member 31 is secured on teeth by the securing ring 48 which is inserted into the ring 44 and rests against the bead 47 in the outer joint member 31.

A wheel assembly having a hub 20 with a flange 21 is joined with an outer joint member 31. The forming of the second set of teeth 29' includes forming an annular shoulder on the hub 20 that extends radially outward from the first set of teeth 29. The annular shoulder limits the axial movement of the outer joint 31.

Preferred embodiments have been disclosed. A worker in the art would recognize modifications would come within the scope of this invention. Thus, the attached claims should be studied.

What is claimed is:

1. A method of producing an assembly comprising the steps of:

providing a wheel hub, a constant velocity joint and means for supporting said wheel hub and said constant velocity joint on a wheel carrier of a motor vehicle, said hub having a flange for fixing a wheel to said wheel hub, said constant velocity joint and said wheel hub being rotatably supported around a common longitudinal axis by a rolling contact bearing comprising two rows of rolling contact members and having an outer bearing ring for being supported by said wheel carrier, said two rows of rolling contact members being preloaded relative to one another in the direction of said longitudinal axis, and said constant velocity joint comprising an outer joint member secured to said wheel hub in the direction of rotation around and in the direction of said longitudinal axis by first and second inter-engaging sets of teeth and said outer joint member, and said rows of rolling contact members being rollably guided on axially spaced outer tracks of said outer bearing ring facing away from one another and on inner tracks facing one another, and at least one of said inner tracks spaced from said flange forming part of a separate inner bearing ring receiving on a bearing face of said wheel hub, with said first set of teeth being arranged at an end of said wheel hub, spaced from said flange, and adjacent said bearing face, and comprising teeth extending parallel to said longitudinal axis;

forming said second set of teeth into a bore of said outer joint member during assembly by moving said first set of teeth axially relative to said outer joint member, said first set of teeth forming part of said wheel hub and said outer joint member holding said rolling contact bearing in a preloaded condition by abutting an end face of said inner bearing ring.

2. A method as set forth in claim 1, further defined as sliding said bearing on said wheel hub having a collar arranged in front of said first set of teeth;

applying force to said bearing after the preloaded has been reached; and independently deforming said collar until it contacts the inner face of said outer joint member.

3. A method as recited in claim 1, wherein said forming step includes the sub-step of sliding said rolling contact bearing onto said wheel hub with said two rows of rolling contact members, with said outer bearing ring and said inner bearing ring being spaced from said flange.

4. A method as recited in claim 3, wherein said forming step includes the sub-step of moving said wheel hub and said outer joint member towards one another along said longitudinal axis while being subjected to an increasing amount of force until said rolling contact bearing carries the desired amount of preloading.

5. A method of producing an assembly comprising the steps of:

a wheel hub, a constant velocity joint and means for supporting said wheel hub and said constant velocity joint on a wheel carrier of a motor vehicle, said wheel hub having a flange for fixing a wheel to said wheel hub, said constant velocity joint and said wheel hub being rotatably supported around a common longitudinal axis by a rolling contact bearing comprising two rows of rolling contact members and having an outer bearing ring for being supported by said wheel carrier, said two rows of rolling contact members being preloaded relative to one another in the direction of said longitudinal axis, and said constant velocity joint comprising an outer joint member secured to said wheel hub in the direction of rotation around and in the direction of said longitudinal axis by first and second inter-engaging sets of teeth and said outer joint member, and said rows of rolling contact members being rollably guided on axially spaced outer tracks of said outer bearing ring facing away from one another and on inner tracks facing one another, and at least one of said inner tracks removed from said flange forming part of a separate inner bearing ring received on a bearing face of said wheel hub, with said first set of teeth being arranged at an end of said wheel hub, removed from said flange, and adjacent said bearing face, and comprising teeth extending parallel to said longitudinal axis;

forming said second set of teeth into a bore of said outer joint member during assembly by moving said first set of teeth axially relative to said outer joint member, said first set of teeth forming part of said wheel hub and said outer joint member holding said rolling contact bearing in a preloaded condition by abutting an end face of said inner bearing, said first set of teeth forming part of a separate ring which holds said rolling contact bearing in a preloaded condition by abutting an end face of said inner bearing ring.

6. A method as set forth in claim 5, further defined as sliding said ring on said wheel hub, said ring having a collar arranged in front of said teeth; applying force to deform said collar until it contacts the inner face of said outer joint member.

7. A method as set forth in claim 5, further defined as deforming said collar by orbital pressing.

8. A method as recited in claim 5, wherein said forming step includes the sub-step of sliding said rolling contact bearing onto said wheel hub with said two rows of rolling contact members, with said outer bearing ring and said inner bearing ring being spaced from said flange.

9. A method as recited in claim 8, wherein said forming step includes the sub-step of moving said wheel hub and said outer joint member towards one another along said longitudinal axis while being subjected to an increasing amount of force until said rolling contact bearing carries the desired amount of preloading.

10. A method as recited in claim 9, wherein said sub-step of sliding continues, and said ring is secured to said wheel hub while maintaining said preloading.

11. A method as recited in claim 10, wherein said first set of teeth are moved relative to said bore of said outer joint member.

* * * * *